United States Patent
Gupta et al.

(10) Patent No.: US 10,521,844 B2
(45) Date of Patent: Dec. 31, 2019

(54) COMPUTER VISION PRODUCT RECOGNITION

(71) Applicant: Wal-Mart Stores, Inc., Bentonville, AR (US)

(72) Inventors: Ankit Gupta, Bangalore (IN); Saurav Shah, Bangalore (IN); Venkata Pranay Kumar Sowdaboina, Bangalore (IN)

(73) Assignee: WALMART APOLLO, LLC, Bentonville, AR (US)

( * ) Notice: Subject to any disclaimer, the term of this patent is extended or adjusted under 35 U.S.C. 154(b) by 673 days.

(21) Appl. No.: 14/553,062

(22) Filed: Nov. 25, 2014

(65) Prior Publication Data
US 2016/0148292 A1    May 26, 2016

(51) Int. Cl.
*G06Q 30/00* (2012.01)
*G06Q 30/06* (2012.01)
*G06F 16/583* (2019.01)

(52) U.S. Cl.
CPC ..... *G06Q 30/0623* (2013.01); *G06F 16/5838* (2019.01); *G06Q 30/0633* (2013.01); *G06Q 30/0639* (2013.01)

(58) Field of Classification Search
CPC ............................................... G06Q 30/00–08
See application file for complete search history.

(56) References Cited

U.S. PATENT DOCUMENTS

| | | | |
|---|---|---|---|
| 9,230,275 B1 * | 1/2016 | Voris | G06Q 30/06 |
| 9,514,491 B2 * | 12/2016 | Pitts | G06Q 30/0625 |
| 2012/0202515 A1 * | 8/2012 | Hsu | G06Q 10/087 |
| | | | 455/456.1 |
| 2013/0132236 A1 * | 5/2013 | Gokturk | G06F 17/30256 |
| | | | 705/26.61 |
| 2013/0268407 A1 * | 10/2013 | Boncyk | G06F 17/30259 |
| | | | 705/26.61 |
| 2014/0337174 A1 * | 11/2014 | Lin | G06Q 30/0623 |
| | | | 705/26.61 |
| 2016/0070439 A1 * | 3/2016 | Bostick | G06F 3/04842 |
| | | | 715/728 |

OTHER PUBLICATIONS

Banking From an Oculus Rift? Google Glass-Clad Tellers? Wells Fargo Tests It Out Dow Jones Institutional News; New York [New York]Sep. 30, 2014. (Year: 2014).*
Wearable tech can change marketing Des Moines Register; Des Moines, Iowa [Des Moines, Iowa]Jul. 27, 2014: 3. (Year: 2014).*

* cited by examiner

*Primary Examiner* — Michael Misiaszek
(74) *Attorney, Agent, or Firm* — Bryan Cave Leighton Paisner LLP

(57) ABSTRACT

A system for computer-aided visual recognition of products may be used by a customer operating a mobile computing device having a camera. A customer can direct the camera at a targeted product for which the customer desires to purchase or learn information. Image recognition operations can be carried out to compare the captured image against images from a prepopulated product image store of known products. Upon a positive match, information regarding the identified product may be gathered and transmitted to the customer and displayed on the mobile computing device. The customer may be presented with various options regarding the identified product, including adding the product to a shopping list, a to-do list, a wish list, or other types of lists.

20 Claims, 6 Drawing Sheets

COMPUTER VISION PRODUCT RECOGNITION

BACKGROUND

In recent years, mobile computing devices have become ubiquitous around the world in many societies. Worldwide, hundreds of millions of mobile computing devices are sold every year. Such devices may be used frequently throughout each day, and thus may be carried by users at nearly all times. Such mobile computing devices include, but are not limited to: smartphones, tablets, e-readers, wearable computing devices such as smart glasses and smartwatches, and other types of mobile electronic computing devices.

A common goal of retail establishments is to maintain frequent contact with customers and potential customers. One way retailers can accomplish this goal is by providing supplemental services, for example via a software program installed on the customer's mobile computing device. Such software programs may be referred to as "apps." Retailers have incentive to encourage use of its apps by customers because transactions may be carried out via the app, or because customers may be more likely to purchase from a retailer after using the retailer's app. Additionally, retailers generally have incentive to make selection and/or purchase of products by customers as easy and convenient as feasible.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
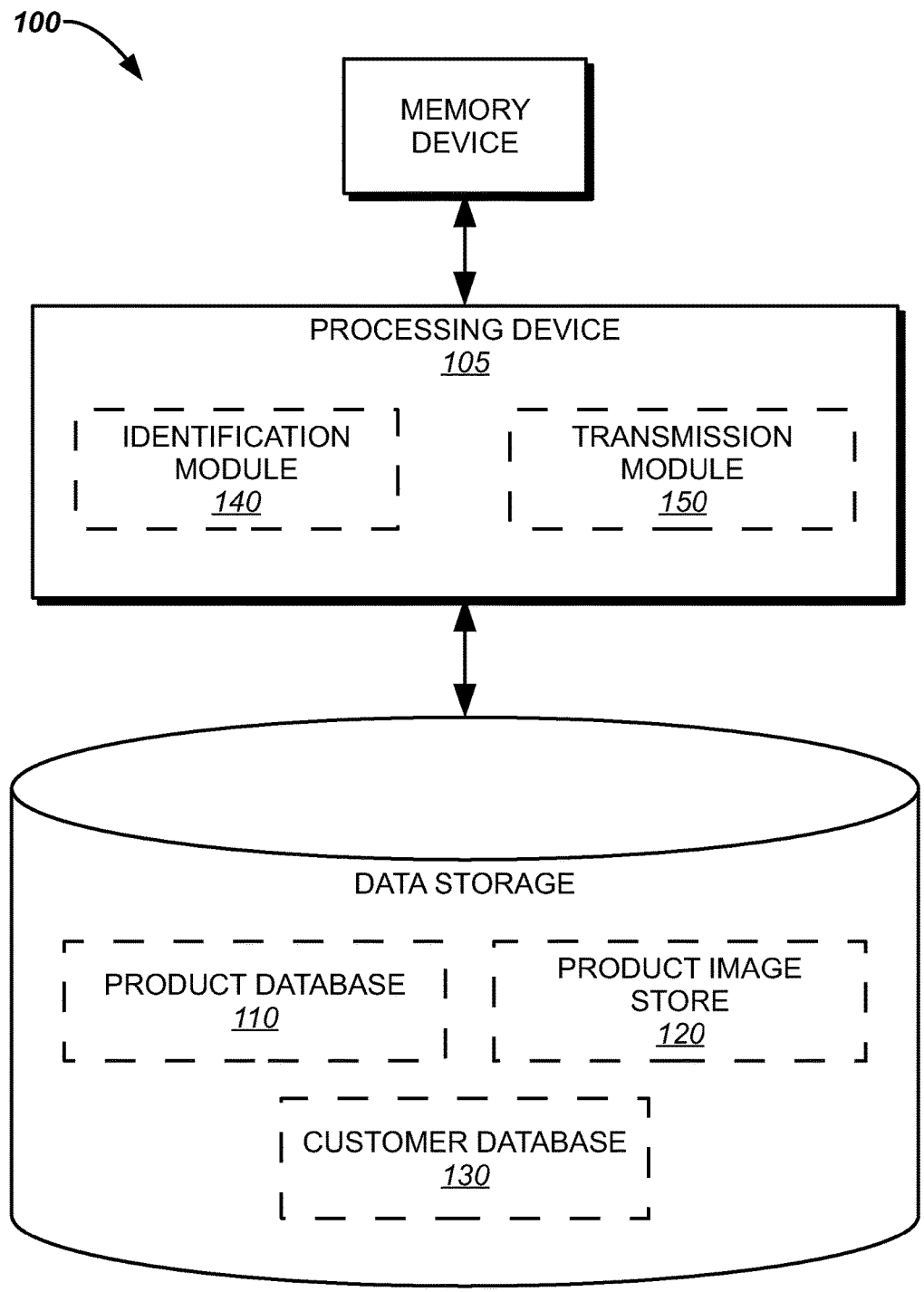
FIG. 1 is a block diagram illustrating a product recognition server according to one embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for inputting a product selection via computer image recognition. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

According to various embodiments of the present disclosure, customers or potential customers of a retailer may make a product identification and/or selection by putting the selected product, or packaging thereof, in a field of view of a mobile computing device camera. The selected product may be identified and/or selected using computer image recognition techniques. In various embodiments, the selected product may be added to a shopping list, a wish list, to-do list, or other list, including user-defined lists, according to preferences of the user.

In other embodiments, additional information regarding the selected product or options with respect to the selected product may be presented to the customer via a display interface of the mobile computing device. Such information may include price information, product reviews, availability of the selected product at one or more selected retail store locations, or other product-specific information. Additionally, the customer may be given the option to purchase the selected product by following a link to an e-commerce interface. Accordingly, embodiments of the present disclosure may enable customers to identify potential products of interest, which may result in increased sales for the retailer.

FIG. 1 is a block diagram depicting a product recognition server 100 according to one embodiment of the present disclosure. In the illustrated embodiment, product recognition server 100 includes a product database 110, product image store 120, and customer database 130. In an embodiment, product recognition server 100 includes a processing device 105 and computer-readable instructions configured to include an identification module 140 and a transmission module 150.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

According to an embodiment, product database 110 includes memory containing the identities of various products. Such products may include products offered for sale in a retail store associated with the commerce server 100. Such products may include products offered for sale on an e-commerce website. Product database 110 can also include consumer reviews of the products. Product database 110 can also include product specifications of the products.

According to an embodiment, product image store 120 includes memory containing numerous prepopulated images of the products. In one example embodiment, product image store 120 includes at least four or five images for each product. In other embodiments, other quantities of images for each product are stored at product image store 120. Such images may include images showing multiple perspectives of each product and/or product packaging. For example, a product may have multiple images, each image respectively depicting the front, back, sides, top, and bottom of the product or packaging. In one embodiment, additional images depict a product outside of its packaging. In one embodiment, product image store 120 includes an association between each product image and the corresponding product in product database 110. In an embodiment, product image store 120 may be continually supplemented with new images of the products.

In an embodiment, customer database 130 includes memory containing data related to customers. In particular embodiments, customer database 130 stores data relating customer preferences and location data including a preferred retail store location. In an embodiment, customer database 130 includes various products that have been previously selected by a customer, purchased by the customer, and/or added to a list by the customer. Lists may include shopping lists, wish lists, other lists, or user-defined lists.

In one embodiment, processing device 105 is adapted to communicate with product database 110 and product image store 120 and receive one or more signals from a mobile computing device used by a customer. Embodiments of processing device 105 include computer readable memory storing computer readable instructions and one or more processors adapted to execute the computer readable instructions.

According to embodiments, identification module 140 can be operable to receive one or more signals from a mobile computing device operated by a customer. Such signals generated by the mobile computing device may include a product image captured by a camera on the mobile computing device. In one embodiment, an image is received at the identification module 140 and compared to images in product image store 120 to find a match between the images. When a match has been found and the product identified, data related to the identified product can be transmitted to the customer. The customer may additionally be presented with options regarding the identified product, such as purchase the product and/or add the product to a list.

Identification module 140 can direct the transmission module 150 to transmit all or some of the information gathered about the identified product to the mobile computing device for display to the consumer.

Embodiments of the present disclosure may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowcharts and block diagram in the attached figures illustrate the architecture, functionality, and operation of possible implementations of systems, methods, and computer program products according to various embodiments of the present disclosure. In this regard, each block in the flowcharts or block diagram may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

Figure 2:
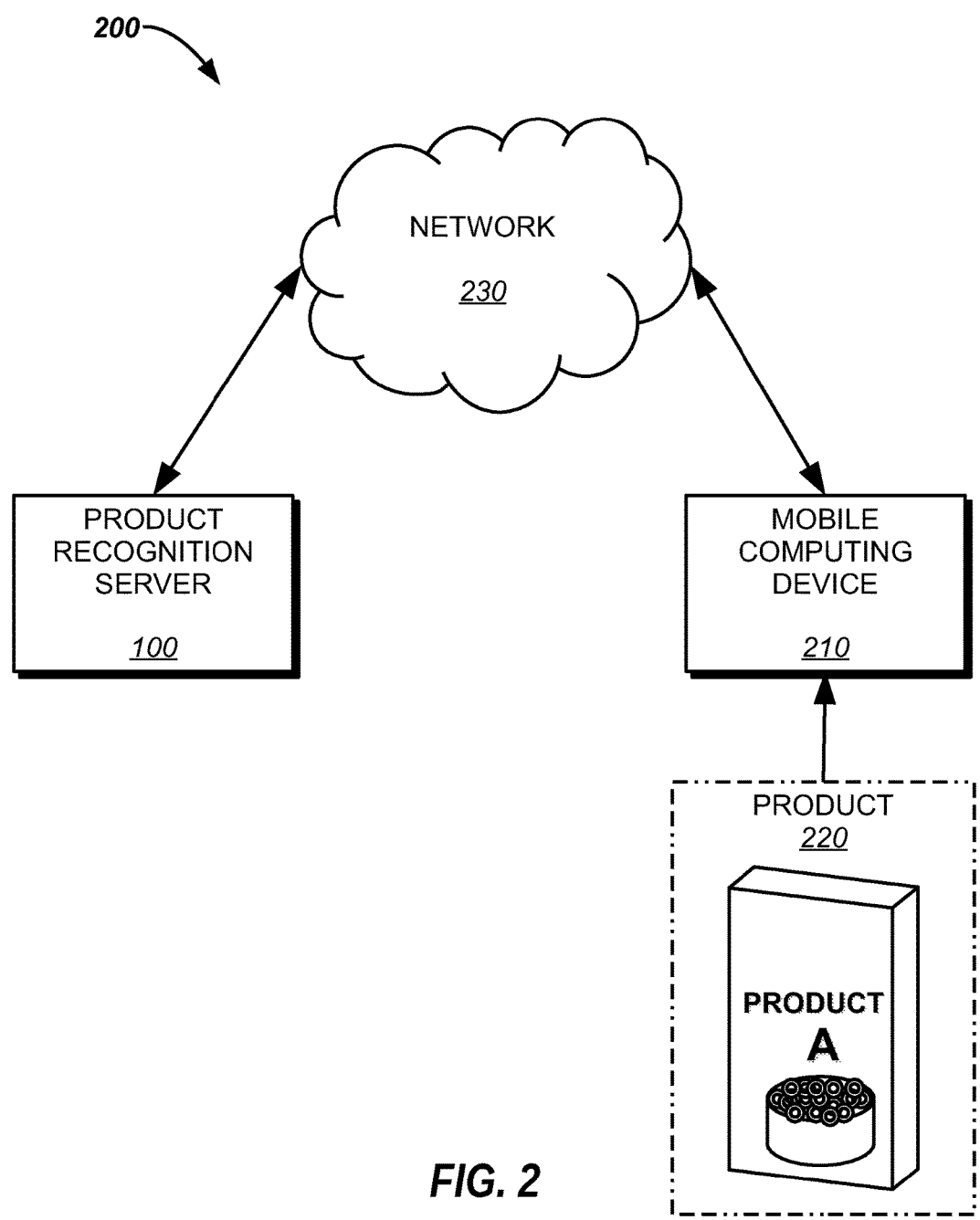
FIG. 2 is a schematic illustrating a product recognition system according to embodiments of the present disclosure.

FIG. 2 is an example schematic illustrating a product recognition system 200 according to embodiments of the present disclosure. Product recognition system 200 can implement a computer-implemented method that includes identifying a product for a customer. The mobile computing device 210 can be possessed and used by a customer to capture an image of a targeted product 220. In various embodiments, the mobile computing device 210 operated by the customer comprises one of a smartphone, a tablet, an e-reader, a wearable computing device such as smart glasses or smartwatches, or any other mobile computing device operable to receive and/or transmit data, or any other electronic computing device operable to receive and/or transmit data, such video data, audio data, and other forms of data.

The signal transmitted from the mobile computing device 210 and received by the product recognition server 100 can be transmitted through a network 230. As used herein, the term "network" may include, but is not limited to, a Local Area Network (LAN), a Metropolitan Area Network (MAN), a Wide Area Network (WAN), the Internet, or combinations thereof. Embodiments of the present disclosure can be practiced with a wireless network, a hard-wired network, or any combination thereof.

In response to the signals received from the mobile computing device 210, product recognition server 100 can identify a targeted product 220 that is depicted in the image captured by the mobile computing device 210 by applying various computer image recognition techniques.

After identifying the product, product recognition server 100 can recall information associated with the product. This information may be stored in product database 110 and made accessible to processing device 105. According to an embodiment, product database 110 includes memory containing the identities of various products. Such products may include products offered for sale in a retail store associated with product recognition server 100. Such products may include products offered for sale on an e-commerce website. After obtaining the information, product recognition server 100 can transmit the information to the mobile computing device 210.

Figure 3:
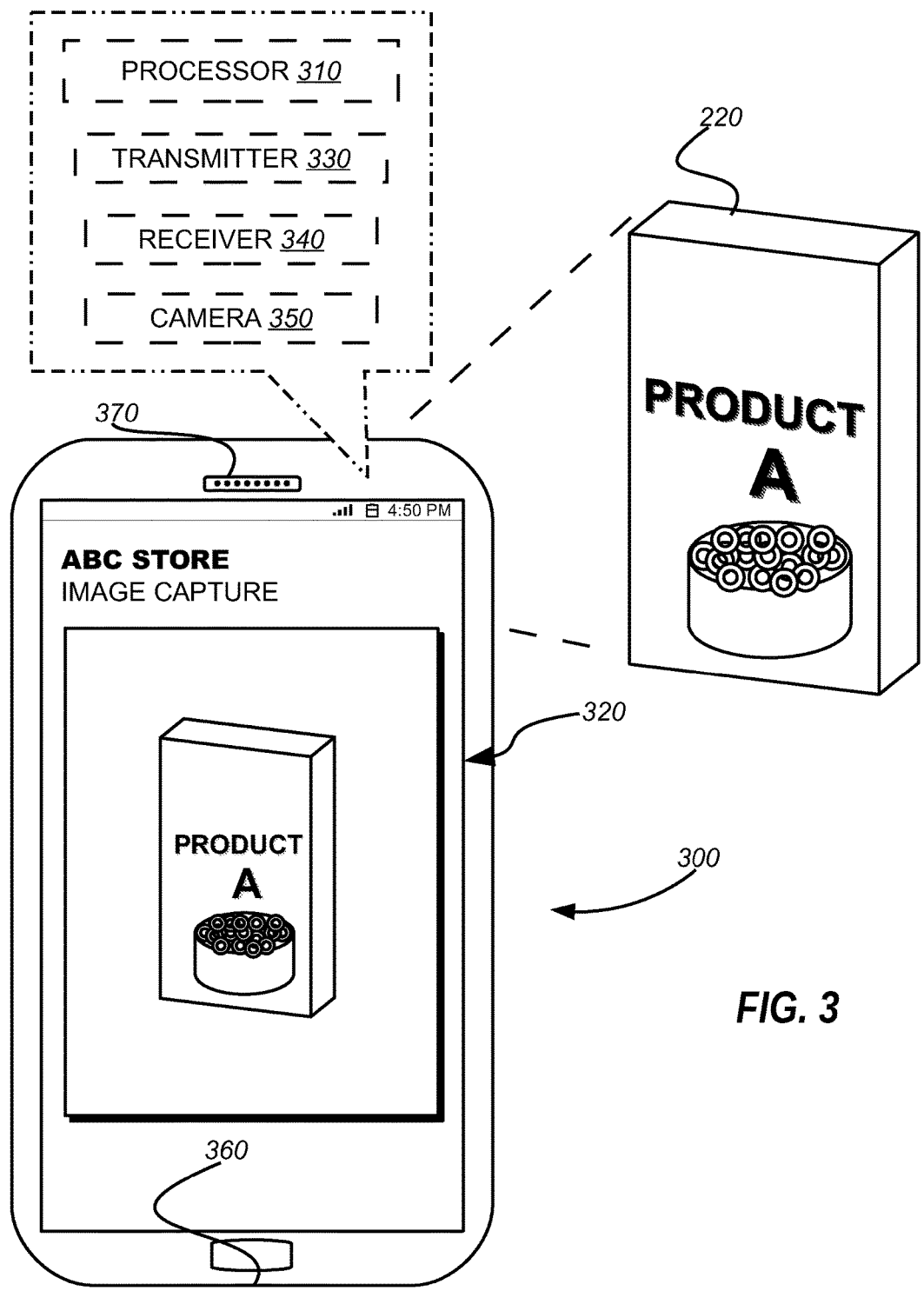
FIG. 3 is an illustration of a use of a smartphone mobile computing device in accordance with embodiments of the present disclosure.

FIG. 3 is an example schematic illustrating a mobile computing device 300 that can be applied in some embodiments of the present disclosure. An embodiment of mobile computing device 300 comprises a processor 310, a display 320, a transmitter 330, a receiver 340, a camera 350, and a microphone 360.

In one embodiment, processor 310 is operable to receive images captured by camera 350, as directed by the customer. Processor 310 can also be operable to control the other components 320, 330, 340, 350 of mobile computing device 300. Processor 310 can also be operable to process signals received by the mobile computing device 300. While a single processor 310 is illustrated, it should be appreciated that the term "processor" can include two or more processors that operate in an individual or distributed manner.

Display 320 may be positioned within the customer's field of view. While the customer directs camera 350 at the targeted product 220, video or still images captured by camera 350 can be shown to the consumer on display 320. Display 320 can be configured to display text, graphics, images, illustrations, user interface objects, and/or any other video signals to the customer.

In an embodiment, transmitter 330 is configured to transmit signals generated by components 310, 350 of mobile computing device 300. Processor 310 can direct signals from mobile computing device 300 to product recognition server 100 via transmitter 330. In an embodiment, transmitter 330 comprises an electrical communication element within processor 310. In one embodiment, processor 310 is operable to direct signals to transmitter 330 and transmitter 330 is operable to transmit the signals from mobile computing device 300, such as to product recognition server 100 through network 230.

In an embodiment, receiver 340 is configured to receive signals and to direct signals that have been received to processor 310 for further processing and/or recording. Receiver 340 may be operable to receive transmissions via network 230 and subsequently communicate the transmissions to processor 310. In various embodiments, receiver 340 comprises an electrical communication element within processor 310. In some embodiments of the present disclosure, receiver 340 and transmitter 330 comprises an integral component.

Transmitter 330 and receiver 340 are adapted to communicate over a Wi-Fi network, allowing mobile computing device 300 to exchange data wirelessly (using radio waves or the like) over a computer network, including high-speed Internet connections. Transmitter 330 and receiver 340 may also apply Bluetooth® standards for exchanging data by using short-wavelength radio transmissions, thereby creating a personal area network (PAN). In an embodiment, transmitter 330 and receiver 340 also apply 3G and/or 4G as defined by the International Mobile Telecommunications-2000 (IMT-2000) specifications promulgated by the International Telecommunication Union.

One embodiment of mobile computing device 300 comprises one or more microphones 360. Microphone 360 is adapted to convert sounds to electrical signals and transmit said signals to processor 310 and/or a speech recognition system. One embodiment of the present disclosure comprises a speech recognition system on mobile computing device 300. Another embodiment comprises a speech recognition system at a remote server. In embodiments, microphone 360 can receive verbal commands from the customer. Said verbal commands can be interpreted and translated to user inputs.

An embodiment of mobile computing device 300 comprises one or more speakers 370. Each speaker 370 can be configured to emit sounds, messages, information, and any other audio signal to the consumer. Speaker 370 can be positioned within the consumer's range of hearing while using mobile computing device 300. Audio content transmitted from product recognition server 100 can be played for the consumer through speaker 370. Receiver 340 can receive an audio signal from product recognition server 100 and direct the audio signal to processor 310. Processor 310 may then control the speaker 370 to emit the audio content.

Figure 4:
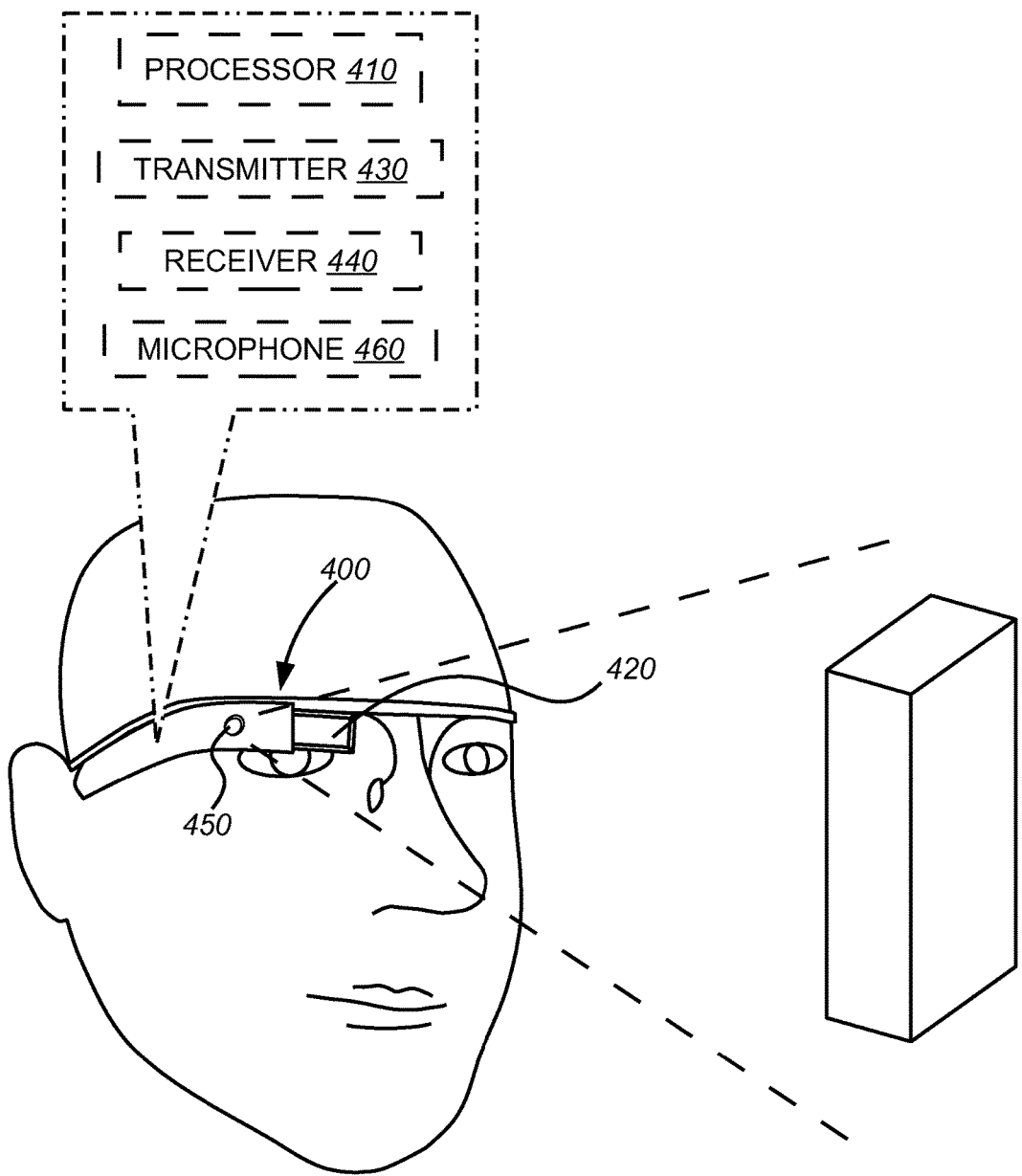
FIG. 4 is an illustration of a use of a smart glasses mobile computing device in accordance with embodiments of the present disclosure.

Referring now to FIG. 4, embodiments of mobile computing device comprise smart glasses 400. In one embodiment, smart glasses 400 comprise a processor 410, a head mounted display 420, a transmitter 430, a receiver 440, a camera 450, and a microphone 460.

In one embodiment, processor 410 is operable to receive images captured by camera 450, as directed by the customer. Processor 410 can also be operable to control the other components 420, 430, 440, 450 of mobile computing device 400. Processor 410 can also be operable to process signals received by the mobile computing device 400. While a single processor 410 is illustrated, it should be appreciated that the term "processor" can include two or more processors that operate in an individual or distributed manner.

Display 420 may be positioned to project an image within the customer's field of view. While the customer directs camera 450 at the targeted product 220, video or still images captured by camera 450 can be shown to the consumer on display 420. Display 420 can be configured to display text, graphics, images, illustrations, user interface objects, and/or any other video signals to the customer.

In an embodiment, transmitter 430 is configured to transmit signals generated by components 410, 450 of smart glasses 400. Processor 410 can direct signals from smart glasses 400 to product recognition server 100 via transmitter 430. In an embodiment, transmitter 430 comprises an electrical communication element within processor 410. In one embodiment, processor 410 is operable to direct signals to transmitter 430 and transmitter 430 is operable to transmit the signals from smart glasses 400, such as to product recognition server 100 through network 230.

In an embodiment, receiver 440 is configured to receive signals and to direct signals that have been received to processor 410 for further processing and/or recording. Receiver 440 may be operable to receive transmissions via network 230 and subsequently communicate the transmissions to processor 410. In various embodiments, receiver 440 comprises an electrical communication element within processor 410. In some embodiments of the present disclosure, receiver 440 and transmitter 430 comprises an integral component.

Transmitter 430 and receiver 440 are adapted to communicate over a Wi-Fi network, allowing smart glasses 400 to exchange data wirelessly (using radio waves or the like) over a computer network, including high-speed Internet connections. Transmitter 430 and receiver 440 may also apply Bluetooth® standards for exchanging data by using short-wavelength radio transmissions, thereby creating a personal area network (PAN). In an embodiment, transmitter 430 and receiver 440 also apply 3G and/or 4G as defined by the International Mobile Telecommunications-2000 (IMT-2000) specifications promulgated by the International Telecommunication Union.

One embodiment of smart glasses 400 comprises one or more microphones 460. Microphone 460 is adapted to convert sounds to electrical signals and transmit said signals to processor 410 and/or a speech recognition system. One embodiment of the present disclosure comprises a speech recognition system on smart glasses 400. Another embodiment comprises a speech recognition system at a remote server. In embodiments, microphone 460 can receive verbal commands from the customer. Said verbal commands can be interpreted and translated to user inputs.

Figure 5:
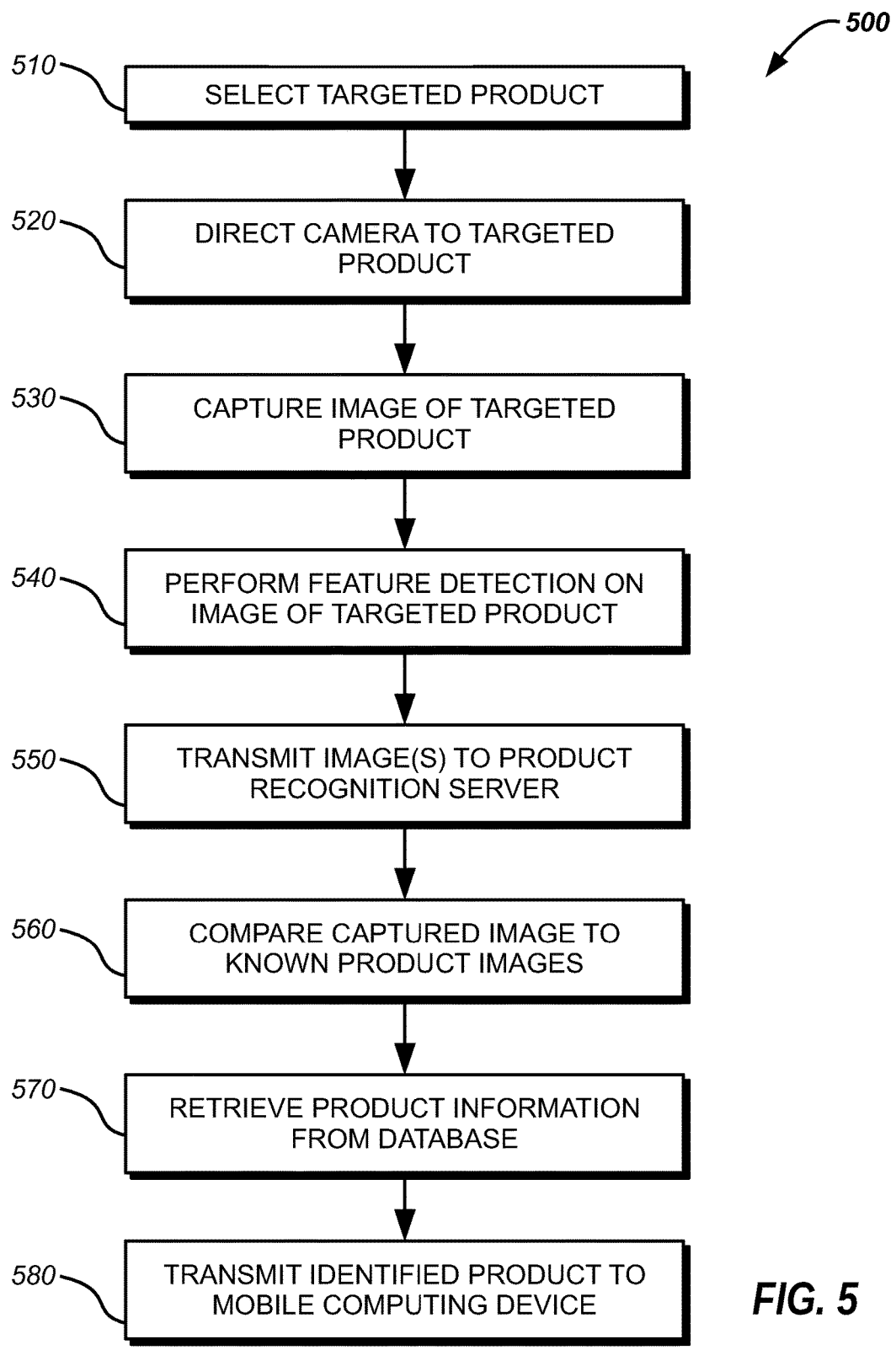
FIG. 5 is a block diagram illustration a method of identifying a product according to one embodiment of the present disclosure.

In operation, product recognition system 200 may facilitate product selection and/or identification for customers via a mobile computing device by using computer image recognition techniques. Referring now to FIG. 5, a method 500 for identifying a product is depicted. Method 500 begins at operation 510, where the customer captures one or more images of a target product. In one embodiment, the customer is at a retail store and captures an image of the targeted product on a store shelf or elsewhere within the store. In another embodiment, the customer is at home and desires to select a product of interest. In another embodiment, the customer is in another setting and has a desire to learn about and/or purchase a product of interest.

In one embodiment, a product of interest is a product that the customer has recently consumed and wishes to repurchase. In another embodiment, the product of interest is a product that the customer would like to add to a wish list, a to-do list, or other type of list. In some embodiments, such lists include user-defined lists. In another embodiment, a product of interest is a product that the customer has observed in use by another, in some form of advertising, or for which the customer otherwise has an interest.

At operation 520, the customer directs a camera of the mobile computing device at the product, product packaging, product advertising, or other indicia of the product of interest, all of which may be referred to herein as the product of interest. In cases where the mobile computing device is a smartphone, the customer may aim one of the cameras on the smartphone toward the product of interest to capture an image of the product of interest. In cases where the mobile computing device is a wearable computing device such as smart glasses, the customer aims the camera at the product of interest, for example by facing the product of interest while wearing the smart glasses.

According to some embodiments, prior to directing the camera of the mobile computing device at the product of interest, the customer can make a selection via a user interface or other input object of the mobile computing device that the customer wishes to enter a product of interest. Thereafter, the mobile computing device may enter into a product acquisition mode. In one embodiment, the customer can enter product acquisition mode by making a voice command. While the mobile computing device remains in the product acquisition mode, it can receive and analyze one or more images captured by the camera to determine the product selection made by the customer.

At operation 530, one or more images are captured by the camera of the mobile computing device for analysis. In one embodiment, the one or more images are transmitted to the processor of the mobile computing device for analysis and product recognition. In other embodiments, one or more captured images are transmitted to product recognition server 100. In alternative embodiments, preliminary processing on captured images is carried out by the processor of the mobile computing device, after which the selected one or more images and the results of said preliminary processing are transmitted to product recognition server 100 for product recognition.

In one embodiment of operation 530, the mobile computing device is in product acquisition mode. According to an embodiment, while the device remains in product acquisition mode, multiple image frames are captured. In one embodiment, the mobile computing device may remain in product acquisition mode and therefore continually capture images until the product of interest has been identified. In one embodiment, each captured frame is analyzed. In another embodiment, only one or more selected frames are analyzed.

According to an embodiment, at operation 540, preliminary processing that is carried out by the processor of the mobile computing device comprises detection of features in each of the one or more selected images captured. In one embodiment, a feature detection algorithm known as SURF (Speeded Up Robust Features) is carried out by the processor of the mobile computing device to detect features of the one or more images. In other embodiments, other feature detection algorithms are carried out to detect features in the one or more images using one or more of any feature detection algorithms that are known or yet to be known. In an embodiment, a feature detection operation is performed on multiple images captured sequentially from the camera on the mobile computing device. Upon completing the preliminary analysis, a selection of one or more images exhibiting a threshold number of detected features may be made from the multiple captured images to transmit to product recognition server 100 for further analysis and product matching. In another embodiment, additional analysis is carried out to make a selection of one or more images to transmit to product recognition server 100.

At operation 550, one or more selected images are transferred to product recognition server 100. As described herein, the transmission may take place over any one of a variety of network types.

At operation 560, the transmitted images are received at product recognition server 100 and compared to images at product image store 120 for matches. According to embodiments, product recognition server 100 is adapted to compensate for image rotation and scaling differences between images. In one embodiment of operation 560, a match score is determined between an image received from a customer and an image at product image store 120. After carrying out image comparison operations between the received image and the images at product image store 120, the highest score may determine the closest match. In one embodiment, a minimum score threshold is instituted so that if no match score exceeds the threshold, it may be presumed that the customer image depicts a product that the retailer does not offer. In one embodiment, machine learning techniques are carried out with respect to the minimum score threshold by inputting multiple known matching images and thus building a model to find matching images.

As would be understood by a person of ordinary skill in the art having the benefit of the present disclosure, images captured by cameras on a mobile computing device may be relatively low resolution in comparison to images generated by a dedicated camera. Thus, lower thresholds may be used in the matching algorithm in order to compensate for anticipated low resolution images received from customers.

In one embodiment of operation 560, recognition and analysis of text, product codes (such as UPC/bar codes) and other information on products or packaging is used to assist product matching. For example, the name of a product may appear as text on the product packaging. An image of the packaging may depict the product name. By extracting such text from the image, the result of the matching operation 560 may be validated.

A result of operation 560 is that a single product has been selected to match the image received from the customer. If the minimum score threshold was surpassed, it may be presumed that the matching product is the one that the customer intended to select. In some embodiments, multiple products are identified from the received images. If so desired, product recognition server 100 may be enabled to identify any number of products depicted. In some embodiments, multiple products are potentially selected from each image frame captured by the customer's camera.

In other embodiments, product recognition server 100 is configured to identify only one product per image, but may receive multiple images, each image depicting a different product. In one embodiment, product recognition server 100 may be configured to only confirm a product selection after identifying the product in a minimum quantity of consecutive images or frames, as captured by the customer's mobile computing device. In this manner, product recognition server 100 may minimize false positive identifications of products. One condition that this embodiment may serve to mitigate is where a customer inadvertently briefly directs the camera of the mobile computing device at a product while moving the mobile computing device around, for example, while panning the camera and unintentionally capturing an image of a product. Because the undesired product may be captured in relatively few image frames, identification of that product may be disregarded by product recognition server 100.

At operation 570, product recognition server 100 queries product database 110 for information related to the one or more selected products. In one embodiment, such information may include price, store availability, product images, product reviews by other customers, and other relevant information relating to the product.

Figure 6:
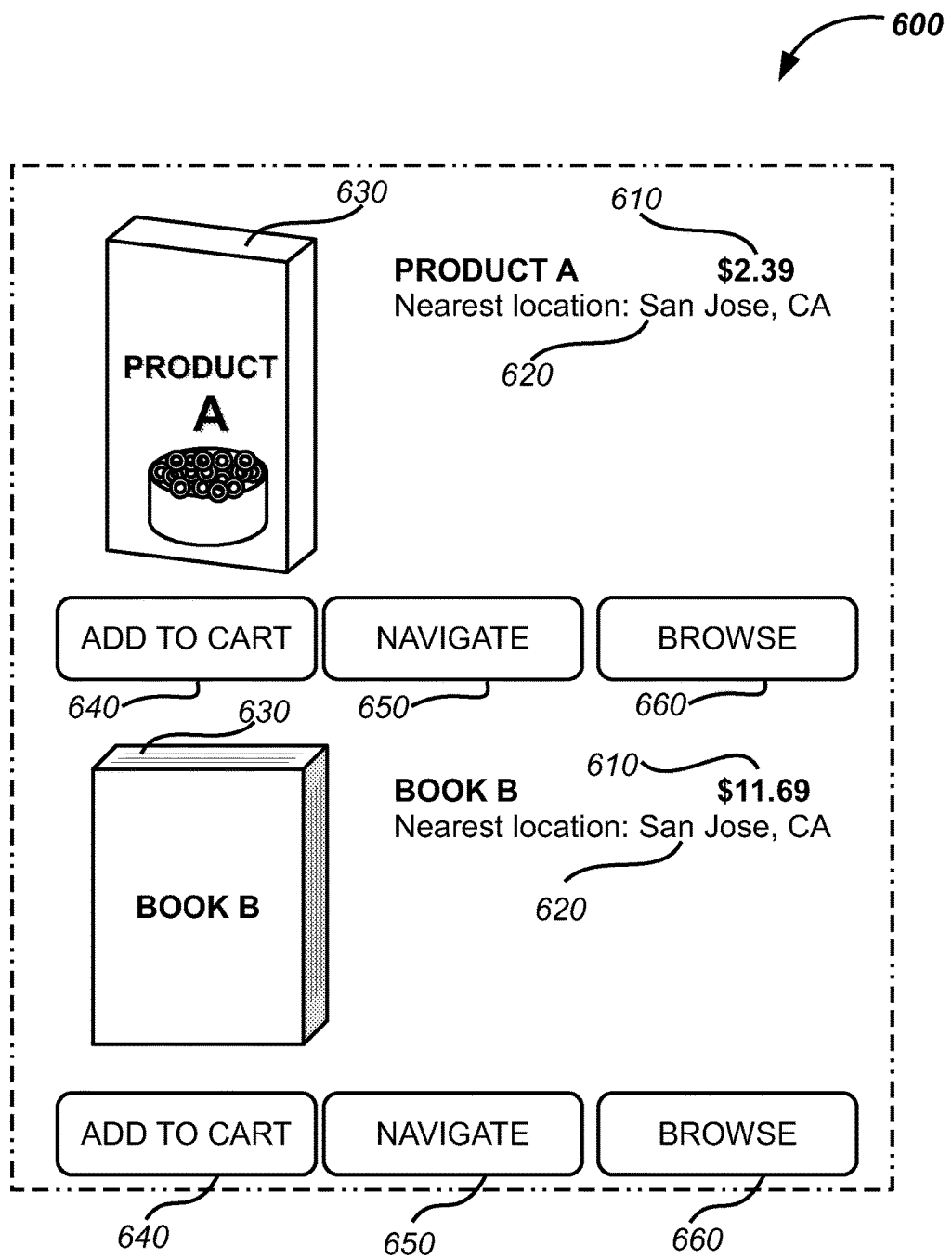
FIG. 6 is an illustrative depiction of a user interface according to one embodiment of the present disclosure.

At operation 580, information relating to the selected product is transmitted from product recognition server 100 to the customer's mobile computing device and displayed for the customer. In an embodiment, the customer is provided various options with respect to the one or more selected products. FIG. 6 is a depiction of an interface 600 displayed to a customer according to various embodiments. In one embodiment, such information may include price 610, store availability 620, product images 630, 635, product reviews, and other desirable information relating to the product. In an embodiment, customer database 130 is queried to determine a preferred and/or closet retail store to the customer. Availability of the product at that particular retail store may then be displayed to the customer.

In one embodiment, the customer may select objects 640, 650, 660 to purchase the identified product, to respectively receive directions to physically get to the product at a retail store, or browse a web-based interface. In one embodiment, the customer is given the option to add one or more selected products to a shopping list, to a wish list, a to-do list, or other lists, including user-defined lists. In an embodiment, one or more lists belonging to any particular customer may be maintained at customer database 130. The customer may be later given the option to view information regarding one or more products on a list and/or purchase products selected from a list.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A computer-implemented method for identifying a product, comprising:

receiving, at a processing device of a product recognition server, one or more signals from a mobile computing device corresponding to consecutively captured images of a targeted product or a packaging of the targeted product, wherein the targeted product comprises the targeted product offered for sale by a retailer or recently consumed by a user, or an advertisement of the targeted product, wherein the mobile computing device comprises smart glasses;

analyzing, at the processing device, the consecutively captured images of the targeted product by comparing each image of the consecutively captured images to a plurality of images of retail products offered for sale by the retailer;

receiving, with the processing device, a match score between the consecutively captured images of the targeted product and the plurality of images of retail products offered by the retailer;

when the match score is lower than a pre-determined minimum match score threshold, determining, at the processing device, that the consecutively captured images of the targeted product does not match the plurality of images of retail products and that the retailer does not offer the targeted product for sale; and when the match score is higher than the pre-determined minimum match score threshold:
   determining, at the processing device, that the consecutively captured images of the targeted product matches at least one image of the plurality of images of retail products offered for sale by the retailer;
   confirming, at the processing device, a product selection of the targeted product after identifying the targeted product within a pre-determined number of the consecutively captured images to minimize false positive identifications of the targeted product;
   obtaining, from a product database, information associated with the targeted product;
   transmitting, from the processing device, the information to the smart glasses by a graphical user interface within a field of view of the user; and
   displaying, on a display of the smart glasses, by the graphical user interface, at least one of a text, graphic, or video including the information.

2. The method of claim 1, wherein the information comprises a retail price of the targeted product.

3. The method claim 1, wherein the information comprises an availability status of the targeted product at a selected retail store.

4. The method of claim 3, wherein the selected retail store is selected based on physical proximity to the mobile computing device.

5. The method of claim 1, wherein analyzing, at the processing device, the consecutively captured images of the targeted product to the plurality of images of retail products further comprises retrieving the plurality of images of retail products from a product image store.

6. The method of claim 1, wherein analyzing, at the processing device, the consecutively captured images of the targeted product to the plurality of images of retail products further comprises applying a feature detection algorithm to the consecutively captured images of the targeted product.

7. The method of claim 6, wherein applying the feature detection algorithm to the consecutively captured images of the targeted product comprises carrying out a Speeded-Up Robust Features (SURF) feature detection algorithm.

8. The method of claim 1, wherein analyzing, at the processing device the consecutively captured images of the targeted product to the plurality of images of retail products further comprises disregarding multiple ones of the consecutively captured images when an undesired product is captured by the consecutively captured images.

9. The method of claim 1, further comprising:
   receiving from the mobile computing device, a signal of the one or more signals indicating an input to add the targeted product to a list; and
   transmitting an instruction to a customer database to add the targeted product to a list associated with an operator of the mobile computing device.

10. The method of claim 9, wherein the list comprises a shopping list.

11. A method for identifying a product, comprising:
   receiving, at a processing device or a product recognition server, one or more signals from a camera of a mobile computing device corresponding to capturing consecutively captured images of a targeted product or a packaging of the targeted product, wherein the targeted product comprises the targeted product offered for sale by a retailer or recently consumed by a user, or an advertisement of the targeted product, wherein the mobile computing device comprises smart glasses;
   analyzing, at the processing device, the consecutively captured images of the targeted product by comparing each image of the consecutively captured images to a plurality of images of retail products offered for sale by the retailer;
   receiving, with the processing device, a match score between the consecutively captured images of the targeted product and the plurality of images of retail products offered by the retailer;
   when the match score is lower than a pre-determined minimum match score threshold, determining, at the processing device, that the consecutively captured images of the targeted product does not match the plurality of images of retail products and that the retailer does not offer the targeted product for sale; and
   when the match score is higher than the pre-determined minimum match score threshold:
      determining, at the processing device, that the consecutively captured images of the targeted product matches at least one image of the plurality of images of retail products offered for sale by the retailer;
      confirming, at the processing device, a product selection of the targeted product after identifying the targeted product within a pre-determined number of the consecutively captured images to minimize false positive identifications of the targeted product;
      obtaining, from a product database, information associated with the targeted product;
      transmitting, from the processing device, the information to the smart glasses by a graphical user interface within a field of view of the user; and
      displaying on a display of the smart glasses, by the graphical user interface, at least one of a text, graphic, or video including the information.

12. A computer-implemented system for identifying a product comprising:
   one or more processors;
   a product recognition server comprising a memory device and a processing device, the memory device storing computer-readable instructions directing the processing device to:
      receive one or more signals from a mobile computing device corresponding to consecutively captured images of a targeted product or a packaging of the targeted product, wherein the targeted product comprises the targeted product offered for sale by a retailer or recently consumed by a user, or an advertisement of the targeted product, wherein the mobile computing device comprises smart glasses;
      analyze the consecutively captured images of the targeted product by comparing each image of the consecutively captured images to a plurality of images of retail products offered for sale by the retailer;
      receive a match score between the consecutively captured images of the targeted product and the plurality of images of retail products offered by the retailer;
      when the match score is lower than a pre-determined minimum match score threshold, determine that the consecutively captured images of the targeted product does not match the plurality of images of retail products and that the retailer does not offer the targeted product for sale; and
      when the match score is higher than the pre-determined minimum match score threshold:
         determine that the consecutively captured images of the targeted product matches at least one image of the plurality of images of retail products offered by the retailer for sale by the retailer;

confirm a product selection of the targeted product after identifying the targeted product within a pre-determined number of the consecutively captured images to minimize false positive identifications of the targeted product;

obtain, from a product database, information associated with the targeted product;

transmit the information to the smart glasses by a graphical user interface within a field of view of the user; and display, on a display of the smart glasses, by the graphical user interface, at least one of a text, graphic, or video including the information.

13. The computer-implemented system of claim 12, wherein the information comprises a retail price of the targeted product.

14. The computer-implemented system of claim 12, wherein the information comprises an availability status of the targeted product at a selected retail store.

15. The computer-implemented system of claim 14, wherein the selected retail store is selected based on physical proximity to the mobile computing device.

16. The computer-implemented system of claim 12, further comprising a product image store.

17. The computer-implemented system of claim 16, wherein the computer-readable instructions further direct the processing device to retrieve the plurality of images of retail products from the product image store.

18. The computer-implemented system of claim 12, wherein the computer-readable instructions further direct the processing device to apply a feature detection algorithm to the consecutively captured images of the targeted product.

19. The computer-implemented system of claim 12, wherein the computer-readable instructions further direct the processing device to disregard multiple ones of the consecutively captured images when an undesired product is captured.

20. The computer-implemented system of claim 12, further comprising a customer database, wherein the computer-readable instructions further direct the processing device to:

receive, from the mobile computing device, a signal of the one or more signals indicating an input to add the targeted product to a list; and transmit an instruction to the customer database to add the targeted product to a list associated with an operator of the mobile computing device.

* * * * *